United States Patent [19]
Niemann

[11] 3,910,471
[45] Oct. 7, 1975

[54] CYCLE LUGGAGE CARRIER AND HOLDING STRAP COMBINATION

[75] Inventor: Heinz Niemann, Herford, Germany

[73] Assignee: Firma ESGE-Marby GmbH & Co., Bielefeld, Germany

[22] Filed: May 28, 1974

[21] Appl. No.: 473,362

[30] Foreign Application Priority Data
Aug. 17, 1973  Germany............................ 2341586

[52] U.S. Cl. ......................................... 224/39
[51] Int. Cl.[2]......................................... B62J 7/08
[58] Field of Search...................... 224/31, 37, 39 R

[56] References Cited
FOREIGN PATENTS OR APPLICATIONS
6,899    3/1956   Germany........................... 224/39 R
459,550  9/1913   France............................. 224/39 R
68,833  10/1951   Netherlands..................... 224/39 R

*Primary Examiner*—Robert G. Sheridan
*Attorney, Agent, or Firm*—Flynn & Frishauf

[57] ABSTRACT

To connect a holding strap to a cycle carrier which has an elongated grid structure defining an article carrying surface, the holding strap is formed of elastic material such as rubber, having one broad, or two spaced narrower strips connected by a hook made as a bent-wire form, hooked below a cross rod of the cycle carrier, passed beneath all the cross rods, and then looped up over the carrier terminating in another wire formed hook, the wire formed hooks being made of similar bent shapes, one hook being extended as a grasping handle for ease of attachment.

10 Claims, 7 Drawing Figures

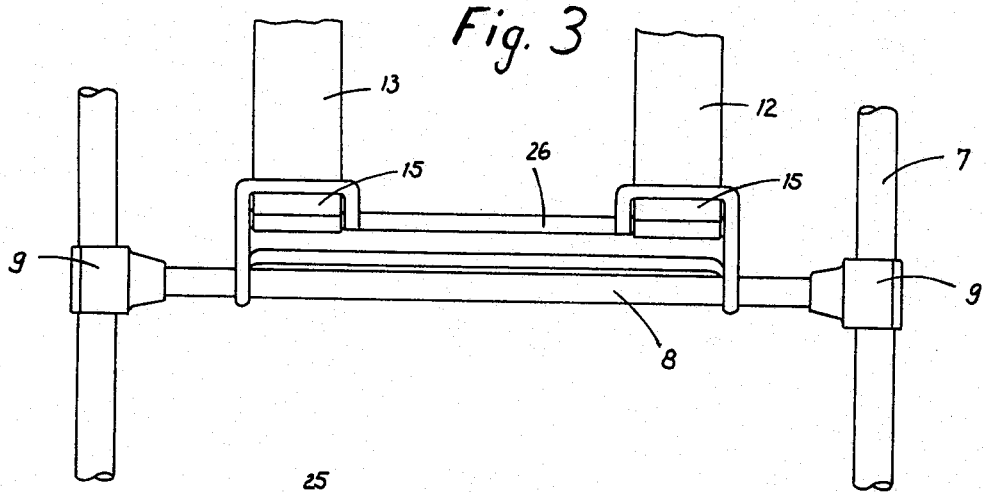

CYCLE LUGGAGE CARRIER AND HOLDING STRAP COMBINATION

The present invention relates to a combination of cycle article carrier and holding strap assembly, and more particularly to a bicycle carrier for combination with an elastic holding strap, which is so arranged that the holding strap, typically of rubber, is secured to an end of the carrier, the other end of the strap being attached to a hook with a handle to permit engagement of the hook with a cross brace or cross bar of the luggage carrier after passing the strap around articles to be carried on the carrier.

It has previously been proposed to utilize closed or endless rubber straps connected to a luggage or article carrier on a bicycle by means of a holding flap or cap, secured to the bicycle carrier itself (see German Patent Publication 1,093,242). Various other spring-pressed or resiliently connected holding arrangements for luggage carriers are known. Some cycle carriers are formed with an upwardly bent portion adjacent the end secured to the bicycle frame in order to provide a protected space for rim, or caliper brakes, or to provide space for a small tool box, or the like. This region of the luggage carrier, therefore, should be left free and not preempted by a mechanism to secure a resilient hold-down mechanism or the like.

It is an object of the present invention to so shape and construct a cycle carrier, and an associated holding strap, that the holding strap can be located on the frame of the cycle carrier without taking up any space which might otherwise be needed for brakes or the like, and which is further so arranged that the holding strap can be readily separated, without loosening screws, or the like, and can be readily reattached to the cycle.

Subject matter of the present invention

Briefly, the strap is connected at one end by means of a hook, engaged from below with a cross rod, or cross brace of the cycle carrier, from the end of the carrier remote from the attachment side of the carrier to the cycle. The strap then passes, beneath the support surface of the cycle and is looped around one of the cross rods of the cycle frame, preferably the last one (that is, the one closest to the frame of the bicycle) and then passes above the holding surface of the carrier, to terminate with its second end by means of a hook which is formed to have a projecting handle, the hook again engaging a cross rod of the cycle carrier. This arrangement of connection of the holding strap does not require any space beyond that of the carrier frame itself, and the strap is readily separated from the carrier, while also permitting versatile connection thereto to hold a variety of articles on the carrier itself.

The invention will be described by way of example with reference to the accompanying drawings, wherein:

FIG. 3 is a fragmentary bottom view of the connection of one end of the holding strap to a cross rod of the carrier;

FIG. 4 is a perspective view of the wire form, including the handle, to connect the second end of the holding strap to the carrier;

FIG. 5 is a top view of the end of FIG. 4;

Figure 1:
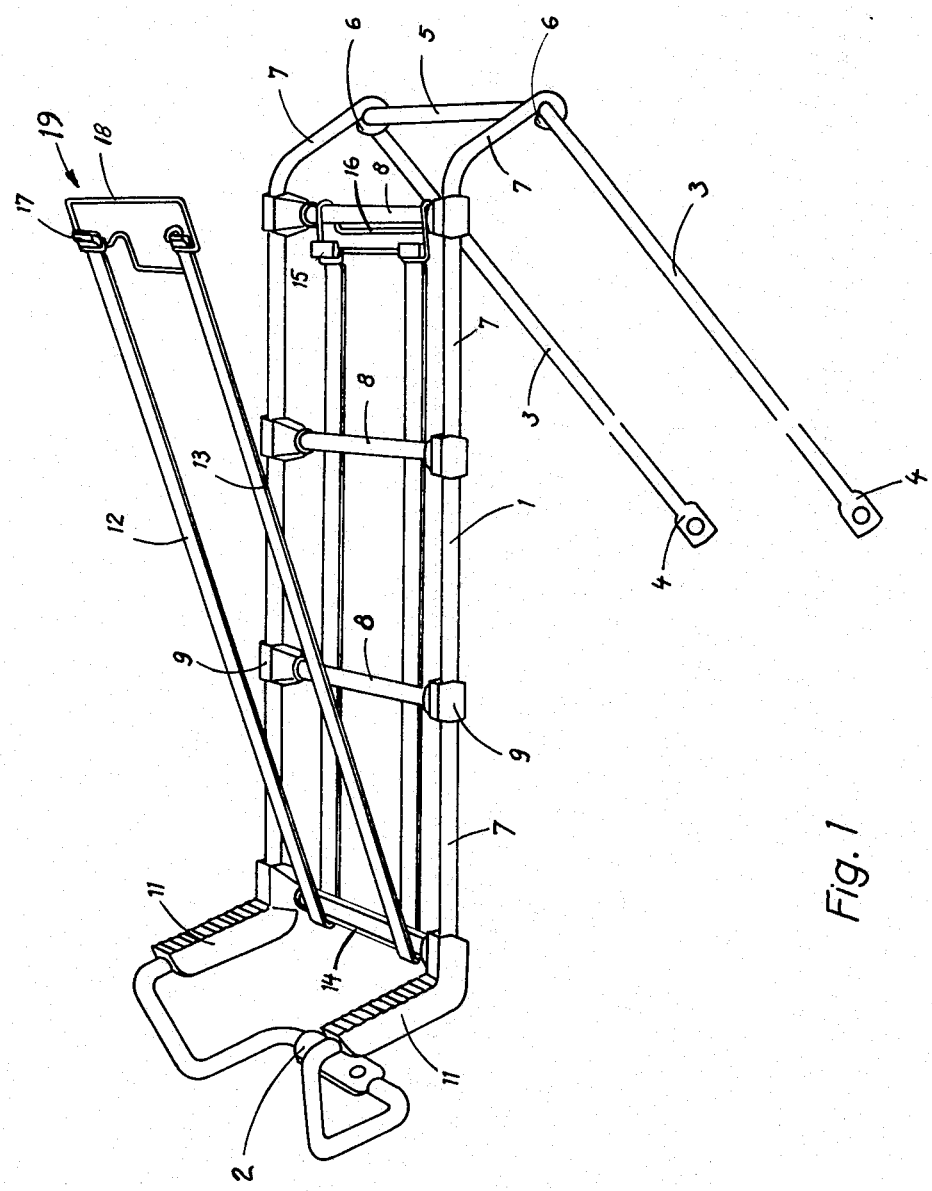
FIG. 1 is a perspective view of the carrier and holding strap combination.
Figure 2:
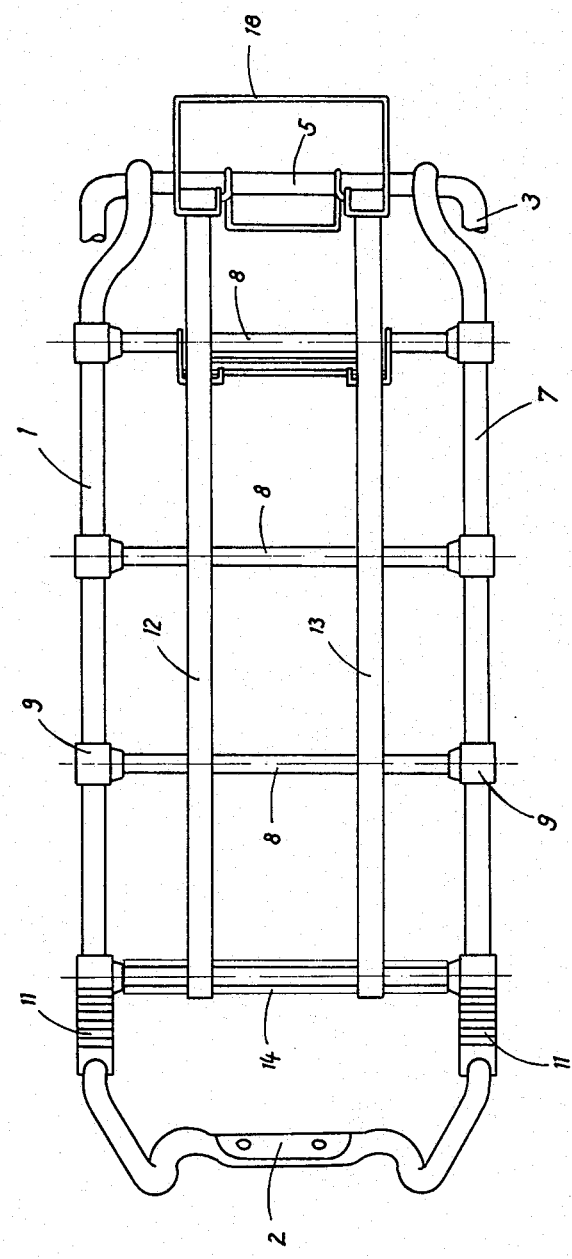
FIG. 2 is a top view of the carrier and holding strap combination.

The cycle carrier has a frame 1 (FIG. 1) with a forward end 2, adapted for connection to the frame of a bicycle by means of a suitable bracket (not shown) and connected to the end 2 by means of screws. The rear end of the cycle carrier is connected to braces 3, 3, integral with a cross element 5; the braces 3, 3 are adapted for connection at their lower ends 4, 4 to the axle of a bicycle wheel. The cross element 5 passes through terminal eyes 6, or other suitable hinges, formed at the ends of the longitudinal bars 7 of the frame 1. The bars 7 are connected transversely by cross rods or struts 8; the struts 8 are connected to the bars 7 by means of plastic injection moldings 9 (see copending application Ser. No. 473,363, filed May 28, 1974. The end of the cycle carrier 1 adapted for attachment to the cycle frame is formed with an upwardly bent, re-entrant portion. The bars 7, at the upwardly bent portion, are covered with a plastic bearing surfaces 11 which, preferably, are integral with the plastic connecting element connecting the first cross rod or brace 8 to the longitudinal bars 7. Plastic bearing surfaces 11 and the first connecting element may form one integral plastic injection molding. The cross rod 8 adjacent the attachment end 2 of the frame is covered with a sleeve 14, preferably of plastic material, and freely rotatable about the respective rod 8. Sleeve 14 may be made simultaneously with injection molding of the connecting elements 9.

The holding strap is formed of a pair of parallel straps 12, 13, which pass beneath the cross rods 8, loop around the first cross rod covered by the sleeve 14, and then pass above the cross rods 8, to hold articles against the plane defined by the frame of carrier 1. The straps 12, 13 are preferably made of highly elastic rubber.

The ends 15 of the straps 12, 13 are connected to the respective cross rod 8 by means of a hook 16. As seen in FIG. 1, the ends 15 are hooked to the first cross brace 8 adjacent the outer terminal ends of the bars 7. The straps 12, 13 then pass beneath the remaining cross rods 8 of the frame 1, around the first cross rod 8 or, rather, around the rotatable sleeve thereof, and then above the cross rods 8, terminating at their other ends 17 in a hook 19, which includes a handle 18, the hook 19 being engageable with any one of the cross rods 8 or, preferably, when not in use or holding only flat elements, being engageable with the cross element 5 of the struts 3, 3.

The rotatable plastic sleeve 14 surrounding the first cross rod 8 permits uniform stretching of the resilient straps 12, 13, and decreasing friction arising upon stretching of the straps 12, 13 about an article to be carried, thus substantially reducing the force necessary to place the straps around articles, and decreasing localized wear on the straps. The straps themselves should be of a material which has the property to adhere well against articles to be carried; natural rubber is preferred; this material, which has good adhesion, and hence frictional contact with underlying articles also would have similar adhesion and frictional contact with the cross braces 8, however, and therefore the rotatable sleeve 14 contributes to the ease of use of the carrier, as well as decreasing wear thereof.

Hook 19, formed with a handle 18 (FIGS. 4 and 5), is made of a pair of formed, shaped wire elements, connected to the second ends 17 of the straps 12, 13. One of the wire elements 20 has a U-shaped central portion 21, which is bent over itself in hook shape. A second, generally U-shaped wire element 22 forms the handle 18. The terminal ends 23, at the legs of the U, are bent inwardly against themselves (see FIGS. 4, 5) again in U-shaped configuration, facing the first U bend. They are connected by the straight laterally bent-over portions 24 of the first wire element 21, for example by spot welding. The spaces between the terminal ends 23 and 24 of the wire elements 22, 20, respectively, form eyes 25 to attach the ends 17 of the two straps 12, 13.

Figure 6:
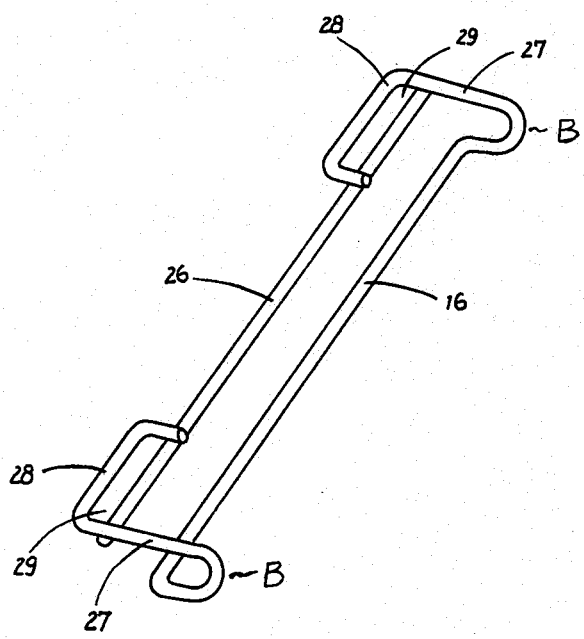
FIG. 6 is a perspective view of the wire formed to connect the first end from below to the cycle carrier.
Figure 7:
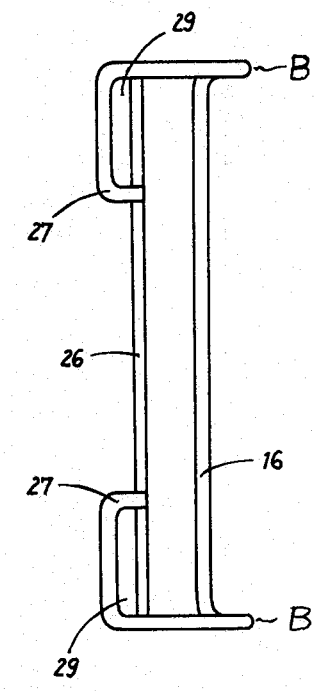
FIG. 7 is a bottom view of the wire form of FIG. 6.

The hook 16 (FIGS. 6, 7) to connect the first end 15 of the straps 12, 13, is also formed of two wire elements. One of the wire elements is a straight piece 26; the second is a generally U-shaped wire element 27, the ends of which are again bent against themselves in a second U-bend. The bent-over ends 28 are connected to the straight wire piece 26, for example by spot welding, and form eyes 29 with the wire element 26 to which the ends 15 of the two straps 12, 13 can be connected. The wire element 27, which is generally U-shaped and is bent over itself to form the hook 16 may be made as exactly the same wire element 22 (FIGS. 4, 5) forming the handle 18, with the additional step that it is bent over itself at points A—A, FIG. 5. This single shaping, or bending or forming of the major wire element, with only one additional bend, to form both hooks 16 and 19, and connection of this element at equally located spot welding points substantially reduces manufacturing costs of the connecting hooks for the straps, since the major bending operations, as well as the welding operations can be carried out in the same jig or die.

The wire element 27 (FIGS. 6, 7) of the hook 16 to connect the first end 15 of the straps 12, 13 is preferably bent over itself to such an extent that it has a slight interference, or snap fit with the associated cross rod 8, and can be removed from the cross rod 8 only by slightly bending the U-bend at B—B (FIGS. 6, 7) outwardly, or by exerting tension against the normal direction of the straps 12, 13, to prevent loosening or undesired removal of the hook 16 from the associated cross brace or cross rod 8.

The cycle carrier can be secured to the rear fork of a bicycle, as well as to the front tubing surrounding the handle bars of a bicycle by suitable brackets.

Various changes and modifications may be made within the scope of the inventive concept. A single, wide strap may, for example, be used, with sides generally adjacent the lateral sides of the carrier, or two straps (see FIG. 1). The hooks, in either case, provide for essentially parallel holding of a single wide strap, or two separated straps, without shift of the entire strap assembly to one side only, which might cause loss of articles from the carrier upon nonsymmetrical loading, or shift of the hook to one side of the carrier during operation of the bicycle. The U-shaped bent portion 21 of the handle 18 is narrower than the hook 16, so that the handle end 19 may be connected to any one of the cross rods 8, whether it is a free cross rod or the one to which the hook end 16 is connected, thus permitting versatile use of a strap of sufficient length to cover and carry bulky objects as well as providing for secure holding of flat articles on the carrier.

I claim:

1. Cycle luggage carrier and holding strap combination comprising
an elongated grid structure defining an article carrying surface, said grid being formed by rod-like grid elements including longitudinal bars (7) and cross rods (8) and an elastic hold-down strap means (12, 13) adapted for connection to a cross rod, looping over articles to be carried on the surface, and releasable re-attachment to a cross rod, wherein a first hook (16) is connected to one end (15) of the strap means, and hooked from below around a cross rod adjacent one end of the grid structure, the strap then passing beneath the cross rods (8) around that cross rod which is closest to the other end of the grid structure and then passes above the cross rods of the grid structure; and a second hook (19) and a handle (18) are provided, connected to the second end (17) of the strap means, said second hook being engageable with a cross rod of said grid structure,
and wherein the second hook (19) comprises a wire structure formed of a first wire element (22) having a U-shaped central part (18) forming said handle, the terminal ends (23) of the legs of said U being bent inwardly;
a second wire element (20) having a U-shaped central part (21), the legs of the U being bent over themselves to form said hook;
the terminal end (23) of the U of the first wire element being secured to the legs of the U of the second wire element (20, said inwardly bent terminal ends forming attachment strips for the strap (12, 13).

2. Combination according to claim 1, wherein said strap means (12, 13) has lateral edges adjacent the sides of the grid structure;
and said first and second hooks are transversely elongated and have engagement surfaces with the cross rods of the grid structure spaced centrally apart to provide for parallel engagement of the hooks on the respective cross rods and prevent unilateral deformation of the strap means.

3. Combination according to claim 1, wherein the strap means comprises a pair of parallel elastic rubber-like straps (12, 13), one each located adjacent the side of the grid structure and connected to said respective hooks adjacent the lateral ends thereof.

4. Combination according to claim 1, comprising a rotatable sleeve (14) surrounding said cross rod (8) around which the strap means (12, 13) are looped to provide for rolling engagement of the strap means and said cross rod.

5. Combination according to claim 1, wherein the terminal ends (24) of the legs of the U of the second wire element are bent outwardly and connected to the legs of the U of said first wire element offset from the connection of the terminal ends of said first wire element (22) to form an attachment eye (25) for the strap means (12, 13) in the space between the terminal ends of the first and the second wire elements.

6. Combination according to claim 1, wherein the first hook (16) comprises a wire structure formed of a wire element (27) having a U-shaped central part, the terminal ends (28) of the legs of the U being bent inwardly;
a cross wire (26);
the terminal ends (28) of the U of the wire element being secured to the cross wire, said inwardly bent terminal ends forming attachment strips for the strap means (12, 13);

the central portion of the wire element being bent over itself to form said hook;

and wherein said first wire element (22) of said second hook (19) including said handle (18) and said wire element (27) of said first hook (16) are similar, the U-shaped central part of the first wire element (22) forming said second hook (19) and said handle (18) being bent over itself (A, A; B, B) to form the hook of the first hook (16).

7. Cycle luggage carrier and holding strap combination comprising an elongated grid structure defining an article carrying surface, said grid being formed by rod-like grid elements including longitudinal bars (7) and cross rods (8) and an elastic hold-down strap means (12, 13) adapted for connection to a cross rod, looping over articles to be carried on the surface, and releasable re-attachment to a cross rod, wherein a first hook (16) is connected to one end (15) of the strap means, and hooked from below around a cross rod adjacent one end of the grid structure, the strap then passing beneath the cross rods (8) around that cross rod which is closest to the other end of the grid structure and then passes above the cross rods of the grid structure; and a second hook (19) and a handle (18) are provided, connected to the second end (17) of the strap means, said second hook being engageable with a cross rod of said grid structure; and wherein the first hook (16) comprises a wire structure formed of a wire element (27) having a U-shaped central part, the terminal ends (28) of the legs of the U being bent inwardly;

a cross wire (26);

the terminal ends (28) of the U of the wire element being secured to the cross wire, said inwardly bent terminal ends forming attachment strips for the strap means (12, 13);

and the central portion of the wire element being bent over itself to form said hook.

8. Combination according to claim 7, comprising a rotatable sleeve (14) surrounding said cross rod (8) around which the strap means (12, 13) are looped to provide for rolling engagement of the strap means and said cross rod.

9. Combination according to claim 7, wherein the central portion is bent over itself to just slightly more than the thickness of a cross rod (8) to form a resiliently yielding snap connection therewith.

10. Combination according to claim 1, further comprising attachment rods (3) for said carrier hinged to said bars and adapted for connection essentially centrally of the wheel of a cycle, said attachment rods having two spaced support portions (3) and a cross connecting portion (5) located parallel to the cross rod (8) and hinged to the terminal ends of the bars (7); and wherein the strap means (12, 13) are hooked into the cross connecting portion (5) and extend around said closest cross rod (8) and then are hooked into the cross rod next adjacent said cross connecting portion (5).

* * * * *